Patented Aug. 14, 1923.

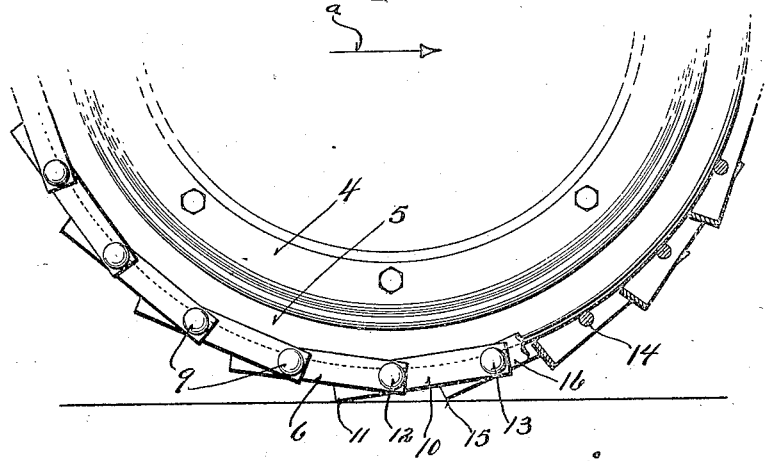
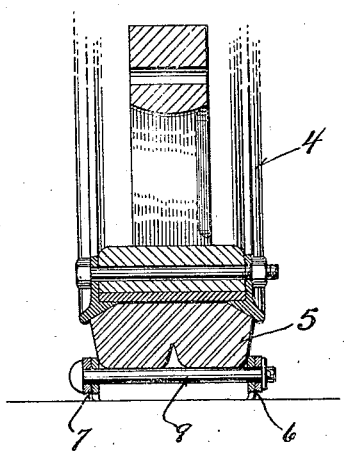
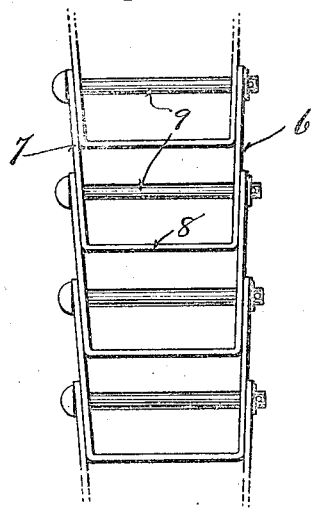

1,464,781

UNITED STATES PATENT OFFICE.

ALEXANDER STEWART, OF WAUPACA, WISCONSIN.

TRACTION DEVICE.

Application filed December 6, 1920. Serial No. 428,769.

*To all whom it may concern:*

Be it known that I, ALEXANDER STEWART, a citizen of the United States, and resident of Waupaca, in the county of Waupaca and State of Wisconsin, have invented certain new and useful Improvements in Traction Devices; and I do hereby declare that the following is a full, clear, and exact description thereof.

This invention relates to traction devices, and more especially to a device of this kind which may be readily applied to any of the vehicle wheels now in use.

The object of the invention is to provide a tread which may be manufactured at a low cost, and at the same time one which will secure a positive and secure engagement with the ground.

A more specific object of the invention is to provide a tread in which the force of the engagement with the ground will vary in proportion to the weight of the load and in which the engaging elements will be projected toward the ground as they approach the same.

In describing my invention reference will be had to the accompanying drawings, in which:

Figure 1 is a fragmentary view in side elevation of a vehicle wheel with my invention applied thereto, a portion of the tread being shown in section.

Figure 2 is a vertical cross sectional view through a portion of the wheel and tread, and Figure 3 is a plan view of a portion of one of the treads detached.

Similar reference characters designate like parts throughout the several views.

The wheel 4 as shown, is equipped with a solid rubber tire 5. To the periphery of this tire is applied my improved tread, which comprises a series of elements formed by the diverging sides 6 and 7, connected at the ends by the webs 8. Each element, therefore, is U-shaped, with the sides of the U diverging. Each element is of substantially uniform cross sectional area and is nested in the preceding element. A hole is bored thru each of the side members adjacent the ends thereof. Each side member has an additional hole therethru adjacent the web. A pivot pin 9 is provided for each element passing thru the holes thereof adjacent the web and also thru the holes in the ends of the side members of the next succeeding element.

Referring to Figure 1, in which the wheel 4 is traveling in the direction indicated by the arrow $a$, the element 10, as shown, is engaging the ground at the point 11. The load supported by the wheel 4 bears on the pivot pin 12 and tends to lower the pivot pin 13, the point 11 acting as a fulcrum. The force thus applied to the pivot pin 13, forces the element 16 downwardly about the pivot pin 14 as a fulcrum, thus projecting the other end of the element 16 into engagement with the ground at 15.

I claim:

A chain tread adapted to be applied to a rubber tired wheel comprising a series of links, each of said links being formed from a strip of metal, said strip being bent to provide a pair of divergent arms and a transverse portion extending between said arms, said arms being integrally connected with said transverse portion along the entire width of said transverse portion, said arms having a pair of aligned openings intermediate of their lengths, said arms having a second pair of aligned openings adjacent their ends, and a transverse pivot member extending thru the aligned end openings of each link and the intermediate openings of an adjacent link.

In testimony that I claim the foregoing I have hereunto set my hand at Milwaukee, in the county of Milwaukee and State of Wisconsin.

ALEXANDER STEWART.